United States Patent Office 3,263,319
Patented August 2, 1966

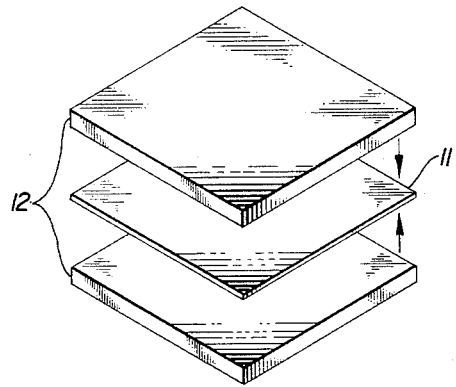
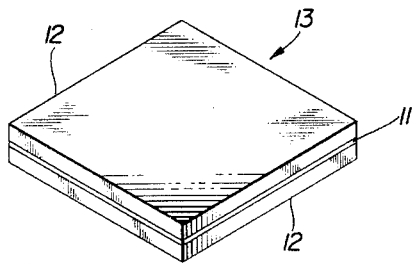
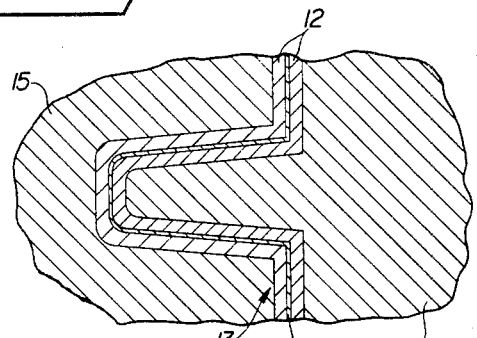
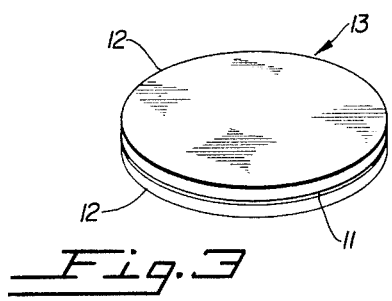
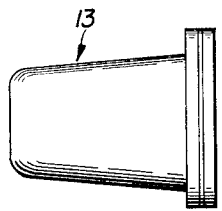
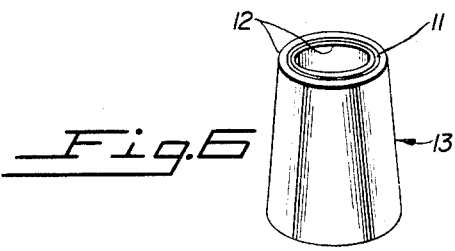
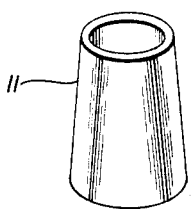
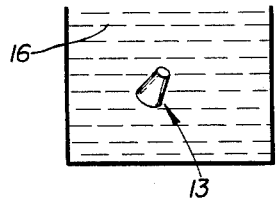

3,263,319
METHOD OF COLD DEEP DRAWING METAL FOIL
William H. Tifft, Bremerton, Wash., John W. McLaughlin, San Jose, and Randolph H. Wendelin, Belmont, Calif., and Michael J. Sandor, Salt Lake City, Utah, assignors, by direct and mesne assignments, to Varian Associates, Palo Alto, Calif., a corporation of California
Filed Feb. 28, 1964, Ser. No. 348,040
6 Claims. (Cl. 29—423)

This invention relates to metal working and more particularly to a method of cold working metal foil into various smooth surfaced hollow shapes by the utilization of a thin layer of metal secured to the foil.

It is well known in the art to form various hollow structures or shapes, such as cups, cylinders, cones, etc., from sheet metal by a variety of cold working steps, such as stamping, cupping, deep drawing, etc. However, difficulty is encountered when the sheet metal being used is only a few mils thick. Using these prior art techniques to cold form sheet metal about a mil thick does not result in smooth surfaced structures. Rather, the resulting structures are cracked, torn, burred, wrinkled and/or have low dimensional tolerances. Accordingly, heretofore in the prior art very thin sheet metal or foil (a few mils thicks or less) has been formed into various shapes by cutting the metal foil into a predetermined flat pattern after which certain edges are secured together by any suitable means, such as soldering or spot welding. Thin walled structures formed in this manner have undesirable weld or solder seams and/or overlaps. These irregularities also create hot spots and gas spots when the structures are utilized in various elevated temperature environments, such as the interior of an electron tube.

Accordingly, an object of this invention is to provide an improved method of cold deep drawing metal foil into a variety of smooth surfaced shapes.

Another object of this invention is to provide a method of cold deep drawing thin metallic foil having a thickness less than .003" into various smooth surfaced, wrinkle, burr and crack free hollow shapes or forms.

A further object of this invention is to provide a method of cold deep drawing .0005" to .005" thick metal foil into various smooth surfaced, burr, crack and wrinkle free hollow shapes by stamping, cupping, deep drawing, etc.

These and other objects of the present invention are accomplished by cold working into a predetermined hollow shape a composite metallic sheet having a thickness of at least .005". The composite metallic sheet includes a first .0005" to .005" thick metallic foil with an unlike second metallic material secured to each side thereof. The composite metallic sheet is cold formed into a predetermined hollow shape by any suitable cold working means, such as by stamping, cupping, deep drawing, etc. The second metallic material is then removed from the shaped composite material by placing the shaped composite material into an acid etching bath that does not react with the metallic foil but does react with the second metallic material which is secured to each side of the metallic foil. This procedure produces a hollow, thin walled structure composed of the .0005" to .005" metallic foil which is smooth surfaced, completely burr, wrinkle and crack free and which has excellent dimensional tolerances.

These and other objects, features and advantages of the present invention will be readily apparent from consideration of the following description relating to the following drawings in which:

FIGURES 1, 2, 3, 4, 5, 6, 7 and 8 illustrate in schematic form various steps in the novel method comprising the subject matter of the present invention.

Referring now to the drawings, wherein like reference characters designate like or corresponding parts throughout the several views, there is illustrated in FIGURE 1 a sheet of metal or metallic foil 11 having a thickness of .0005" to .005". The terms "metal" and "metallic" as used herein to describe and claim the present invention may be defined as any elementary metal, metal alloy, or any metal-like material. In accordance with a preferred embodiment of the present invention, the metal foil 11 illustrated in FIGURE 1 is composed of Kovar or tantalum having a thickness of about .001" (1 mil).

A composite metallic sheet having a thickness of at least .005" is formed by physically securing a layer of a second unlike metal or metallic material 12 to each side of the foil 11. In accordance with a preferred embodiment of the present invention, each layer of the second metal 12 material is composed of Monel having a thickness of about .005".

The second metallic material 12 is physically secured to each side of the metallic foil 11 by any suitable means, such as cold rolling, or by pressing the second metallic material onto the metallic foil under pressure and/or temperature. The resulting composite metallic sheet, generally indicated by the reference character 13, is illustrated in FIGURE 2 and comprises the metal foil 11 having secured to each side thereof the second metallic material 12. The thickness of the composite metallic sheet illustrated in FIGURE 2 is preferably about .011".

Before the composite metallic material 13 is cold formed into a predetermined hollow shape, it may be desirable to cut or otherwise form the composite sheet 13 into a predetermined pattern, such as the circular shape illustrated in FIGURE 3. Subsequently, the composite metallic sheet is cold formed into any predetermined hollow shape, such as by stamping, cupping or deep drawing. For example, FIGURE 4 illustrates in partial cross section a male 14 and female 15 die which has been utilized to cold form the circular section of composite material 13 illustrated in FIGURE 3 into a substantially frusto conical shape.

The substantially frusto conical shape produced by the dies 14 and 15 illustrated in FIGURE 4 is shown in FIGURE 5. The end portions of the shaped composite material 13 illustrated in FIGURE 5 may be removed by any suitable means, such as lathe trimming to form the frusto conical shape illustrated in FIGURE 6 which comprises the composite metallic material 13 including the metallic foil 11 and the second metallic material 12.

In order to remove the second metallic material 12 from the metallic foil 11, the shaped composite material 13 illustrated in FIGURE 6 is immersed in an acid etching bath 16 as illustrated in FIGURE 7. The acid etching bath is such that the acid does not react with the metallic foil 11 but does react with the second metallic material 12 to remove the second metallic material 12 from the foil 11. In accordance with a preferred embodiment of the present invention, when the metallic foil is Kovar and the second metallic material is Monel, the etching bath comprises clear, approximately 70% strength, concentrated nitric acid. For purposes of describing and claiming the present invention, clear concentrated nitric acid comprises nitric acid that has not been exposed to light and which has a clear or water-like color.

The reaction of the acid on the second metallic material 12 produces a gas which in turn produces bubbling in the acid. When the reaction is complete, indicated by the absence of any gas causing bubbling, the resulting smooth surfaced, wrinkle, burr and crack free shaped metallic foil 11 is removed from the acid bath and rinsed in deionized water, rinsed again in acetone and then dried by any suitable means, such as a heat lamp. This procedure results in a smooth surfaced completely burr, wrinkle and tear free shaped structure as illustrated in FIGURE 8 which is composed of the original metallic foil material 11. Diameter tolerances of ±.001″ have been readily obtained by the method comprising the subject invention.

The thickness of the metallic foil 11 will be determined by the material used and the thickness desired for the resulting hollow shaped structure. For example, some materials of a few mils thickness can be cold formed by prior art techniques, whereas others cannot. Generally, however, prior art techniques are unsatisfactory when used to cold form metallic foil .005″ thick or less. Such metallic foil can more advantageously be cold formed in accordance with the teachings of the present invention.

More than one shaped composite material structure can be placed in the etching bath 16 simultaneously. However, the reaction of the acid with the second metallic material heats the acid. Therefore, when more than one shaped composite structure is placed in the etching bath at one time, a suitable volume of etching acid should be utilized that prevents the etching bath from overheating. Also, the metallic foil, the second metallic material and the etching bath must be compatable with each other, that is, the etching bath must react with the second metallic material 12 but not with the metallic foil 11. As stated hereinabove, clear concentrated nitric acid can be utilized as the etching bath when the metallic foil 11 is Kovar or tantalum and the second metallic material 12 is Monel.

It is to be understood that the present invention is not limited to cold working thin metallic foil into the frusto conical shape illustrated in FIGURES 4 through 8, for as will be obvious to those skilled in the art, the subject matter of this invention may be utilized to cold form various other hollow shapes, such as cylinders, cones, cups, etc.

What has been described is a new and novel method of cold working thin metallic foil into various predetermined hollow shapes that are smooth surfaced and completely wrinkle, burr, crack and tear free.

What is claimed is:

1. A method of cold forming a metal foil having a thickness of about .001″ and composed of a metallic material selected from the group consisting of Kovar and tantalum comprising the steps of securing a layer of Monel to each side of the metal foil to form a composite metallic sheet having a thickness of at least .005″, cold working the composite metallic sheet to form a predetermined hollow form, removing any unwanted portion of said formed composite metallic material, removing the Monel from the shaped composite material by submerging the shaped composite material in clear concentrated nitric acid.

2. The method defined in claim 1 wherein the step of removing any unwanted portion of the shaped composite metallic material includes lathe trimming.

3. The method of forming thin metallic foil into smooth surfaced, wrinkle, burr, and crack free hollow forms, comprising the steps of assembling a thin metallic foil with a thin layer of a second metal on each side thereof, said assembly having an over-all thickness between about .005 inch and .015 inch, deep drawing said assembly into a predetermined deep hollow form, and removing said layers of said second metal from the sides of said formed metallic foil.

4. The method according to claim 3 wherein said second metal is Monel and said metal foil is selected from the group consisting of Kovar and tantalum.

5. The method according to claim 3 including the step of removing any unwanted portion of said formed metallic foil prior to the step of removing said layers of said second metal from the sides thereof.

6. The method according to claim 5 wherein the step of removing any unwanted portion of said formed metallic foil includes lathe trimming.

References Cited by the Examiner

UNITED STATES PATENTS

| | | | |
|---|---|---|---|
| 1,060,361 | 4/1913 | Rea | 29—424 |
| 2,140,131 | 12/1938 | Helfrick | 72—47 X |
| 2,837,817 | 6/1958 | Kelley | 29—424 |
| 3,063,142 | 11/1962 | Kroon | 29—424 |

JOHN F. CAMPBELL, *Primary Examiner.*

WHITMORE A. WILTZ, THOMAS H. EAGER,
*Examiners.*